Nov. 6, 1951      T. ZUSCHLAG      2,574,311
MAGNETIC TESTING OF ELONGATED MATERIAL
Filed May 5, 1949
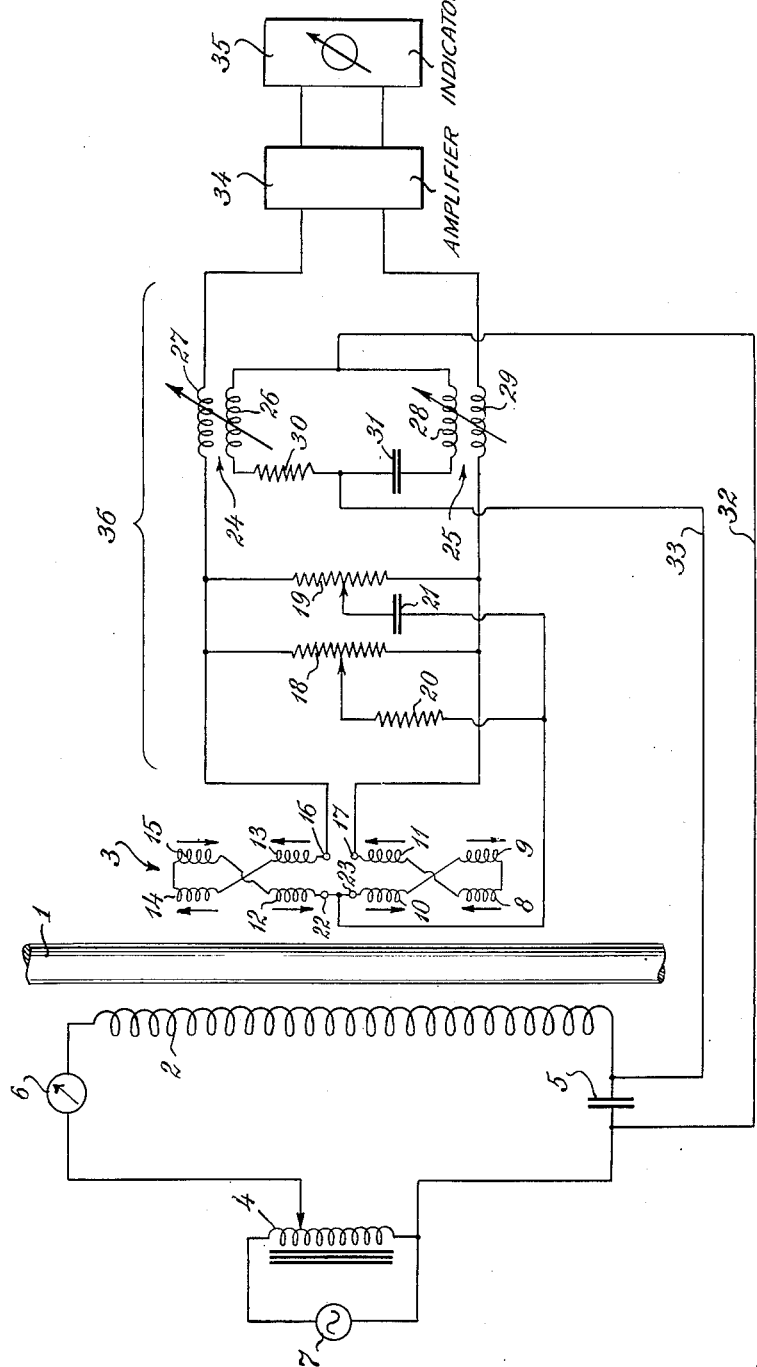
INVENTOR
*THEODORE ZUSCHLAG*
BY
Pennie, Edmonds, Morton & Barrows.
ATTORNEYS Patented Nov. 6, 1951

2,574,311

UNITED STATES PATENT OFFICE 2,574,311

MAGNETIC TESTING OF ELONGATED MATERIAL

Theodore Zuschlag, West Englewood, N. J., assignor to Magnetic Analysis Corporation, Long Island City, N. Y., a corporation of New York Application May 5, 1949, Serial No. 91,454

9 Claims. (Cl. 175—183)

This invention relates to the magnetic testing of magnetic material, especially elongated material of uniform cross-section such as bar stock and tubing.

Various methods and apparatus have been proposed for magnetic testing and all of them are, as a rule, better adapted to the testing of certain types of materials or certain types of defects or flaws more than of others.

The system of the present invention provides by means of apparatus of comparative simplicity, a system by which magnetic material can be tested for a wide variety of flaws and other defects including those of such nature and at such locations in the material as to be substantially undetectable by previously known systems. By means of the present invention (1) it is possible to detect flaws of both low and high gradients, viz, flaws of the nature of a gradual change, as well as flaws of the nature of an abrupt change; (2) the test indications are symmetrical regardless of the direction of longitudinal movement of the test piece through the pickup coils; (3) flaws can be detected even when the test piece is stationary; (4) flaws occurring close to the end of the test piece can be detected; and (5) the test indications are not affected by change of permeability of the test material, such, for example, as may result from variations in temperature of the material during testing procedure.

Briefly, the present invention comprises means for introducing into a coupling circuit and thence into the indicating circuit, a component of energizing voltage or a component of detected voltage, or both together, each adjustable as to phase and magnitude. The invention will be understood from a consideration of the accompanying drawing which comprises a circuit diagram of a preferred embodiment thereof.

Referring to the drawing, the elongated magnetic material 1 under test is shown to be in inductive relation to energizing coil 2 and detector or pickup coils 3. Energizing coil 2 is connected in an energizing circuit including an energizing transformer 4, a coupling element 5 and an ammeter 6, all connected in series. The transformer 4 may be energized by any suitable source 7 of alternating-current power which, for convenience, is here assumed to be of 60 cycles. Transformer 4 is represented as of the auto-transformer type having an adjustable secondary tap, permitting the energizing voltage to be adjusted as required. Any other suitable type of power transformer may be employed. Energizing coil 2 may, as is the case with all of the other components, be designed to have any suitable or required characteristics. In the embodiment herein described by way of example this coil may be assumed to comprise, say, approximately 800 turns of insulated wire wound on a diameter sufficient to enclose pickup coils 3, which in turn should also preferably encircle the material 1 to be tested.

The pickup coils, generally designated by reference character 3, comprise eight coils arranged in four pairs of two coils each, each pair comprising an inner coil and an outer coil. These pairs of coils, which for convenience may be considered to be two sets of two pairs of coils in a set, are symmetrically disposed with respect to energizing coil 2. All of these coils preferably have a common longitudinal axis which is also the longitudinal axis of coil 2 and of test piece 1. Coils 9, 11, 13 and 15 are wound over coils 8, 10, 12 and 14, respectively, and the mentioned pairs of coils are arranged as shown, coils 10, 11 and 12, 13 comprising inside pairs and coils 8, 9 and 14, 15 comprising end pairs. All the coils of the several pairs are connected in series, as shown, with such polarity that the current at a given instant will flow in each coil in the direction indicated by the arrow adjacent thereto. With current reversal, all of the arrows would be reversed. In view of the fact that the test coils are connected in series, two terminals 16, 17 remain for the purpose of connecting the coil system to an external circuit. Inner coils 8 to 14 may be alike and outer coils 9 to 15 may be alike. All of these coils may comprise, say 150 turns, wound to ¼ inch width. The outside coils must obviously be of slightly larger diameter than the inside coils.

The external circuit which couples pickup coils 3 to appropriate indicating apparatus includes several novel features providing advantages mentioned above and also hereinafter. This coupling circuit 36 is connected to terminals 16, 17 and includes phase-adjusting elements comprising potentiometers 18, 19, resistor 20 and condenser 21. The resistors of potentiometers 18, 19 are connected across terminals 16, 17. Phase shifting elements comprising resistor 20 and condenser 21 are connected, respectively, to the sliders of potentiometers 18 and 19. The remaining terminals of resistor 20 and condenser 21 are connected in common, as shown, to a point between terminals 22 and 23 of coils 12 and 10, respectively. Terminals 22, 23 are electrically at the center of the system of the pickup coils 3. In the present example, the resistances of potentiometers 18, 19 may be of 10,000 ohms each, the value of resistor

20 of 10,000 ohms and the capacity of condenser 21 of 0.3 microfarad.

Connected symmetrically in the coupling circuit 36 are coupling devices 24, 25 which comprise variocouplers. Variocoupler 24 comprises a primary winding 26 and a secondary winding 27; and variocoupler 25 comprises a primary winding 28 and a secondary winding 29. In a manner well known in the art, the inductive coupling between the respective primary and secondary windings of these variocouplers is adjustable between substantially zero and a maximum value which may provide a high percentage of coupling. Primary windings 26 and 28 are connected in series in a primary circuit including resistor 30 and condenser 31. This primary circuit comprises a second phase-adjusting circuit which is symmetrically connected by conductors 32 and 33 across coupling element 5. It will be seen from the circuit diagram that conductor 32 is connected to the common terminals of coils 26 and 28 and that conductor 33 is connected to the common terminals of resistor 30 and condenser 31. In the embodiment here described by way of example coupling condenser 5 may be of approximately 60 microfarads, condenser 31 may be of about 1 microfarad, resistor 30 of about 5,000 ohms, and the windings of variocouplers 24 and 25 may be of about 200 turns each.

Although coupling circuit 36 may be employed to couple the output of the pickup coil circuit directly to an indicator 35, it is usually preferable that an amplifier 34 be interposed to permit the indications of flaws and other defects over a wide range of magnitudes. It is, therefore, preferable that such amplifier be of the adjustable gain type. This amplifier requires no further description since various devices which would be suitable for the purpose are well known in the art.

Indicator 35 is generally represented because it may take any of several well known forms. For example, it may be of the meter type, of the oscilloscope type, of the recording type, or of any desired combinations thereof.

Operation

Assuming that coil 2 is suitably energized, an alternating-current energizing field is generated around specimen 1 which for purposes of initial balance should be without flaws or other defects. During balancing (as well as during testing), the specimen may be either stationary or moving in either direction along its longitudinal axis.

Although the system of test coils 3 is assumed to comprise similar coils symmetrically disposed with respect to each other and to the energizing coil 2 there will usually be slight unsymmetry between the windings and coil positions which would produce an indication on indicator 35. To balance out this indication, variocouplers 24, 25 are first set to positions of minimum coupling and potentiometers 18, 19 are adjusted so as to introduce into the coupling circuit 36 two voltage components, 90° out of phase and of correct relative amplitudes. As is evident from the circuit diagram, this out-of-phase balancing voltage is derived from a symmetrical point in the pickup coil circuit. This type of balancing adjustment is useful in adjusting to a standard specimen, and is advantageous in the event that the test indications are to be independent of fluctuations in the energizing current flowing in coil 2. As a result, the system as a whole may be put into an unusually stable condition which will permit of high amplification in amplifier 34, thus to provide clear indications of extremely small defects.

Alternatively, the desired balance can be effected by leaving potentiometers 18, 19 set as, for example at their midpoints, and adjusting the couplings of variocouplers 24, 25 until the desired balance is indicated on indicator 35. The balancing adjustments should be made while the specimen is moving because movement may slightly affect the energizing current. These adjustments introduce into the coupling circuit 36 out-of-phase voltage components which in this instance are derived from the voltage across coupling element 5 in the energizing circuit. This type of balancing adjustment is advantageous in the event that variations from whatever cause affect the current in energizing coil 2. Fluctuations of energizing current in coil 2 may be caused by variation in energizing current from source 7, or from the reactions on the energizing circuit due to certain types of defects or other variations in the material 1 under test. Hence, if the system is initially balanced with respect to such variations, any deviation from the balanced condition, including continuous defects, will be indicated.

Under many circumstances it is preferable that both of the above-mentioned balancing adjustments be employed simultaneously; as, for example, to detect the existence of, and if desired to measure the magnitude of, long or continuous defects. In this case potentiometers 18 and 19 may be slightly displaced from their central positions and the resulting out-of-phase voltage components in the coupling circuit 36 be compensated by appropriate adjustment of variocouplers 24 and 25. In most such cases this second step of adjusting variocouplers 24 and 25 until a balanced condition is indicated, will also automatically balance any "natural" unbalance as distinguished from the mentioned artificial unbalance deliberately introduced by displacement of potentiometers 18 and 19. By such unbalancing of the coupling circuit with respect to the pickup coil system the defect is emphasized, while at the same time the system as a whole is balanced with respect to possible deviation in the energizing circuit, so as to permit maximum amplification and resulting sensitivity of the indicator.

I claim:
1. A system for testing magnetic material which comprises: an energizing circuit including a coupling element and an energizing coil adapted to be disposed in magnetic relation to material under test; a detecting circuit including a plurality of symmetrically disposed series-connected detecting coils adapted to be placed in magnetic relation to said material; indicating apparatus; a coupling circuit serving to couple said detecting circuit to said apparatus; means included in said coupling circuit and connected to said detecting circuit for introducing into said coupling circuit and thus into said indicating apparatus a component of detected voltage adjustable as to phase and magnitude; a phase-adjusting circuit; adjustable coupling devices serving to couple said phase-adjusting circuit to said coupling circuit; and connections effectively connecting said coupling element in said energizing circuit and said phase-adjusting circuit for introducing into said coupling circuit and thus into said indicating apparatus a component of energizing voltage adjustable by said adjustable coupling devices as to phase and magnitude.

2. A system according to claim 1 wherein said means comprises two impedance elements connected in said coupling circuit, a resistor connectible to one impedance element, a condenser connectible to the other impedance element, and a common connection from a symmetrical point in said detecting circuit to said resistor and condenser.

3. A system for testing magnetic material which comprises: an energizing circuit including a coupling element and an energizing coil adapted to be disposed in magnetic relation to material under test; a detecting circuit including at least one detecting coil adapted to be placed in magnetic relation to said material; indicating apparatus; a coupling circuit serving to couple said detecting circuit to said apparatus; means included in said coupling circuit and connected to said detecting circuit for introducing into said coupling circuit and thus into said indicating apparatus a component of detected voltage adjustable as to phase and magnitude; a phase-adjusting circuit; adjustable coupling means serving to couple said phase-adjusting circuit to said coupling circuit; and connections effectively connecting said coupling element in said energizing circuit and said phase-adjusting circuit for introducing into said coupling circuit and thus into said indicating apparatus a component of energizing voltage adjustable by said adjustable coupling devices as to phase and magnitude.

4. A system for testing magnetic material which comprises: an energizing circuit including a coupling element and an energizing coil adapted to be disposed in magnetic relation to material under test; a detecting circuit including a plurality of symmetrically disposed series-connected detecting coils adapted to be placed in magnetic relation to said material; indicating apparatus; a coupling circuit serving to couple said detecting circuit to said apparatus; means included in said coupling circuit and connected to said detecting circuit for introducing into said coupling circuit and thus into said indicating apparatus a component of detected voltage adjustable as to phase and magnitude; a phase-adjusting circuit; adjustable coupling means serving to couple said phase-adjusting circuit to said coupling circuit; and connections from said coupling element in said energizing circuit to said phase-adjusting circuit for introducing into said phase-adjusting circuit and thus into said coupling circuit and said indicating apparatus a component of energizing voltage adjustable by said adjustable coupling means as to phase and magnitude.

5. A system for testing magnetic material which comprises: an energizing circuit including coupling means and an energizing coil adapted to be disposed in magnetic relation to material under test; a detecting circuit including a plurality of symmetrically disposed series-connected detecting coils adapted to be placed in magnetic relation to said material; indicating apparatus; a coupling circuit serving to couple said detecting circuit to said apparatus; said coupling circuit including two potentiometers connected in parallel across said series-connected detecting coils, a connection from the variable contact of each potentiometer to a point electrically centered in said detecting circuit, a condenser connected in one of said connections and a resistor connected in the other of said connections whereby to introduce into the indicating apparatus a component of detected voltage adjustable as to phase and magnitude; a pair of adjustable inductive coupling devices each having a primary winding and a secondary winding, the primary winding and the secondary winding of each device being inductively coupled together in adjustable relation such as to provide a range of coupling from substantially zero to a maximum value; each secondary winding being connected symmetrically in one side, respectively, of said coupling circuit; a primary circuit including in series connection said primary windings, a condenser and a resistor, one end each of said primary windings being connected together and the other ends thereof being connected respectively to said condenser and resistor; a connection from a point between said last-named condenser and resistor, and a connection from a point between said two primary windings; said last-named connections being connected, respectively, to each side of the coupling means in said energizing circuit, whereby to introduce into the indicating apparatus a component of energizing voltage adjustable as to phase and magnitude.

6. In a system for testing magnetic material, indicating apparatus, and four pairs of detecting coils symmetrically arranged with respect to each other and adapted to be disposed in a row in inductive relation to material under test, the coils of each pair being wound one over the other, connections forming two sets of said coils each set comprising two adjacent pairs, the inner and outer coils of each pair being connected together in the same series circuit and disposed in opposing magnetic relation, the inner coils and the outer coils of adjacent pairs in said sets being connected together in the same series circuit and disposed in aiding magnetic relation so as to leave two terminals for each set of coils, a connection from a terminal of one set to a terminal of the other set of coils connecting said two sets of coils in series, and connections from the remaining two terminals to said indicating apparatus.

7. In a system for testing magnetic material, indicating apparatus, an energizing circuit adapted to be disposed in inductive relation to material under test, a detecting circuit including four pairs of detecting coils adapted to be placed in inductive relation to material under test, each pair comprising two similar coils wound one over the other to comprise an outer coil and an inner coil, said pairs of coils being symmetrically disposed along an axis common to all of said coils end to end so as to form two end pairs and two inside pairs, the coils of said pairs being connected together such that the instantaneous current flow in the inner coils and in the outer coils, respectively, of the end pairs is in the same direction, and in the inner coils and in the outer coils, respectively, of the inside pairs is in the same direction, and the instantaneous current flow in the outer and inner coils of the end pairs with respect to that in the outer and inner coils of the inside pairs, respectively, is in opposite directions, and connections from coils of the inside pairs to said indicating apparatus.

8. In a system for testing magnetic material, indicating apparatus, a detecting circuit including four pairs of detecting coils adapted to be placed in inductive relation to material under test, each of said pairs comprising two similar coils wound one over the other to comprise an outer coil and an inner coil, said pairs of coils being symmetrically disposed end to end along an axis common to all of said coils so as to form two end pairs and two inside pairs, the coils of said pairs being connected together such that the instantaneous current flow in adjacent inner coils of the outside and inside pairs is in opposite directions, and in adjacent outer coils of the outside and inside pairs is in opposite directions, and the instantaneous current flow in both inner coils of the inside pairs is in one direction and the instantaneous current flow in both outer coils of said inside pairs is in a direction opposite to that last mentioned all of said coils being so connected together in series as to provide two terminals symmetrically disposed with respect to said pairs of coils, and connections from said terminals to said indicating apparatus.

9. In a system for testing magnetic material, indicating apparatus, an energizing circuit adapted to be disposed in inductive relation to material under test, a detecting circuit including four pairs of detecting coils adapted to be placed in inductive relation to material under test, said detecting circuit including two terminals, each of said pairs comprising two similar coils wound one over the other to comprise an outer coil and an inner coil, said pairs of coils being symmetrically disposed end to end along an axis common to all of said coils, the coils of said pairs being connected together in series in such order and with such polarity that four of said detecting coils are connected in series aiding so that the instantaneous current flow is in one direction through said four coils, and the other four of said detecting coils are connected in series aiding so that the same instantaneous current flow is in the opposite direction through said other four coils, and so that the same instantaneous current flow is in opposite directions through the outer coil and inner coil of each pair, and connections from said terminals of said detecting circuit to said indicating apparatus.

THEODORE ZUSCHLAG.

REFERENCES CITED

The following references are of record in the file of this patent:

UNITED STATES PATENTS

| Number | Name | Date |
|---|---|---|
| 2,124,579 | Knerr et al. | July 26, 1938 |
| 2,337,231 | Cloud | Dec. 21, 1943 |
| 2,455,792 | Neunier | Dec. 7, 1948 |